United States Patent [19]
Kendrick et al.

[15] 3,691,257
[45] Sept. 12, 1972

[54] ORGANIC POLYMERS CONTAINING SILOXANE-ORGANIC BLOCK COPOLYMERS

[72] Inventors: Thomas Charles Kendrick, Llanblethian, Cowbridge, Glamorgan; Michael James Owen, Llandough, Penarth, Glamorgan, both of Wales

[73] Assignee: Midland Silicones Limited, Reading, England

[22] Filed: March 18, 1969

[21] Appl. No.: 808,355

[30] Foreign Application Priority Data

March 29, 1968 Great Britain..........15,281/68

[52] U.S. Cl.........260/827, 117/132 BS, 117/161 ZA, 260/3, 260/13, 260/17 R, 260/33.4 SB, 260/33.6 SB, 260/37 SB, 260/41 B, 260/824 R, 260/824 EP, 260/826
[51] Int. Cl. .....C08g 47/10, C08f 29/12, C08f 33/08
[58] Field of Search.......................260/824, 827, 826

[56] References Cited

UNITED STATES PATENTS

| | | |
|---|---|---|
| 3,051,684 | 8/1962 | Morton et al..............260/827 |
| 3,305,504 | 2/1967 | Huntington................260/827 |
| 3,436,252 | 4/1969 | Neuroth.....................260/827 |
| 3,471,588 | 10/1969 | Kanner et al..............260/827 |
| 3,478,075 | 11/1969 | Jack et al...................260/827 |
| 3,483,270 | 12/1969 | Bostick.......................260/827 |

*Primary Examiner*—Samuel H. Blech
*Attorney*—Herbert H. Goodman

[57] ABSTRACT

A composition comprising (1) an organic polymeric material selected from the group consisting of polyolefins, polyethylene terephthalate, polyvinyl chloride, polyvinylidene chloride, polystyrene, polymethyl methacrylate, natural rubber, polyisoprene, butadiene-styrene copolymer, chloroprene polymers, isobutylene polymers, acrylic resins, epoxy resins, polyamides, butadiene-acrylonitrile copolymers, melamine-formaldehyde resins, phenol-formaldehyde resins, and urea-formaldehyde resins; and (2) from 0.001 to 10 percent by weight based on the weight of said organic polymeric material of a linear block copolymer comprising at least one organosiloxane block (A) containing at least 20 units of the formula $R_2SiO-$ wherein each R is selected from the group consisting of hydrogen atoms, monovalent hydrocarbon radicals, monovalent halogen-substituted hydrocarbon radicals and amino alkyl radicals and at least some of the R groups in said organosiloxane block are not hydrogen; and an organic block (B) selected from the group consisting of polymers formed by the polymerization of at least one compound selected from the group consisting of methyl methacrylate, styrene, chlorostyrene, alpha methyl styrene, vinyl chloride, vinyl pyridine, acrylonitrile, butadiene, isoprene, epsilon-caprolactum, and olefins, said organic block being at least partially compatible with said organic polymeric material; and said linear block copolymer being of the type BAB or of the type AB wherein B represents said organic block and A represents said organosiloxane block.

17 Claims, No Drawings

ORGANIC POLYMERS CONTAINING SILOXANE-ORGANIC BLOCK COPOLYMERS

This invention relates to compositions comprising organic polymers and block copolymers containing organosiloxane and organic blocks.

It has long been known that organopolysiloxanes may be incorporated into organic polymer compositions to modify the processing characteristics thereof. For example it is known that extrudability and calendering of such materials may be improved by incorporating therein liquid dimethylpolysiloxanes.

The use of an organopolysiloxane in this way has been found to provide on the surface of the thermoplastic a lubricating, water repellent layer of siloxane. The polysiloxane accumulates at the surface by virtue of its insolubility in the thermoplastic and the advantages attendant on the presence of the polysiloxane tend to disappear with time due to the ease with which this insoluble polysiloxane film can be removed.

We have now discovered that the surface properties of organic polymers and compositions containing them, may be beneficially modified by incorporating in the polymer or composition certain copolymers of polysiloxane units and organic polymer units. We have further found that the surface modification obtainable with the said copolymers is of a significantly more permanent nature than that obtainable with the previously employed homopolymeric siloxanes.

Accordingly this invention provides a composition comprising (1) an organic polymeric material and (2) from 0.001 to 10 percent by weight based on the weight of (1) of a block copolymer comprising (a) at least one organosiloxane block containing at least two units of the formula $R_2SiO$ wherein each R represents a hydrogen atom or an organic radical, at least some of the R groups being organic and (b) at least one organic block derivable from one or more of vinyl monomers, polydiene monomers, lactams, lactones or one or more of these with a cyclic ether, the said organic block being at least partially compatible with the organic polymeric material (1).

The invention also includes a process for modifying the surface properties of organic polymers which comprises incorporating therein from 0.001 to 10 percent by weight of the specified block copolymers.

This invention is applicable to the surface modification of a wide variety of organic polymeric materials and component (1) of the compositions of this invention may comprise any organic polymer or composition containing an organic polymer which is susceptible to the incorporation therein of the block copolymer. The organic polymeric material may be for example a thermoplastic such as polyolefins (e.g., polyethylene, polypropylene), polyamides, polyethylene terephthalate, polyvinyl chloride, polyvinylidene chloride, polystyrene and polymethyl methacrylate, an organic rubber, for example natural rubber, polyisoprene, butadiene-styrene copolymer, butadiene-acrylonitrile copolymer, chloroprene polymers and isobutylene polymers, resins such as epoxy resins, acrylic resins, phenol-formaldehyde resins, melamine-formaldehyde resins and urea-formaldehyde resins and cellulosic compounds such as cellulose acetate and cellulosic butyrate.

By means of the process of this invention organic polymers, or compositions containing organic polymers, may be endowed with surface properties characteristic of the presence thereon of an organopolysiloxane. Such properties are well known and typical examples are those of surface lubricity, water repellency, release and antistatic properties and weatherability. The compositions of this invention may thus take any of several forms. For example the block copolymer may be incorporated with a solid thermoplastic polymer such as polyethylene to improve the processing characteristic thereof and in such a case the composition may consist predominantly of the organic polymer and the block copolymer. More commonly, however, the organic polymer will be present in conjunction with one or more of various fillers, diluents, hardening catalysts and other additives. For example, the block copolymer may be added to a paint or other protective coating composition to improve the finish and the weathering properties thereof and/or to provide the applied coating with a surface which is resistant to contamination, yet which can accept further coats of the paint containing the block copolymer without impairing intercoat adhesion.

The block copolymers which constitute an essential ingredient of the compositions of this invention are in general terms a known class of materials. They should contain at least one organic block derivable from one or more of vinyl monomers, diene monomers, lactams, lactones or from one or more of these and cyclic ethers, the organic block being such that it is at least partially compatible with the organic polymeric material (1). The block copolymer may contain the respective diorganosiloxane blocks and organic blocks in any desired configuration. Thus the copolymer may be of the AB type, or of the ABA, ABAB, BAB, $X(AB)_m$, $X[A(BA)_n]_m$ or $A(BA)_n$ wherein A represents a siloxane block, B represents an organic block, X is a polyfunctional group, and $m$ and $n$ are integers. The block copolymer may therefore be linear in configuration, as in the case of the $A(BA)_n$ structure, or branched, as is the case when the group X is present and $m$ has a value greater than two.

The siloxane blocks should contain at least two organosiloxane units of the formula $—R_2SiO—$, wherein each R is a hydrogen atom or an organic radical, at least some, preferably 50 percent or more of the R radicals being organic.

The organic radicals R present in the organosiloxane blocks may be selected from monovalent hydrocarbon radicals and monovalent substituted hydrocarbon radicals. They may, for example be alkyl radicals such as methyl, ethyl, propyl, butyl and octyl radicals, alkenyl radicals such as vinyl, allyl and cyclohexenyl radicals, aryl radicals such as phenyl, diphenyl, tolyl and benzyl radicals, halogenated hydrocarbon radicals such as chloromethyl, trifluoropropyl and bromophenyl radicals and monovalent substituted radicals such as aminoalkyl, poly(amino)alkyl, cyanoalkyl and mercaptoalkyl radicals. The choice of organic radicals in the organosiloxane block will depend on the nature of the modification required to the surface of the organic polymer (1). For example where antistatic properties are required it will be advantageous to include at least some polar organic radicals in the organosiloxane blocks. Where water repellency or lubricity are of interest at least some of the R radicals should be methyl. For most purposes the R radicals are preferably methyl and the organosiloxane blocks are blocks of dimethylsiloxane units.

Preferably at least one of the organosiloxane blocks should contain at least 20 units although the size of the blocks may be varied to achieve the surface properties desired in the organic polymers. It is also usually preferable to employ block copolymers or relatively low molecular weight, e.g., from 2,000 to 50,000, since this is believed to facilitate the renewal of the surface following abrasion.

The organic portion of the copolymer may be homopolymeric or copolymeric, that is it may contain a single type of monomeric unit or it may contain more than one type of monomeric unit. For example the organic blocks may consist of a specific type of vinyl monomeric unit, two or more types of vinyl monomeric units or they may contain both vinyl monomeric units and diene monomeric units in any combination. The organic blocks may therefore consist of polymeric units derived from one or more organic monomers such as methylmethacrylate, ethyl acrylate, polymerizable olefins (e.g., ethylene, propylene) styrene, chlorostyrene, alpha methyl styrene, vinyl chloride, vinyl acetate, vinyl pyridine and substituted vinyl pyridines, acrylonitrile, butadiene, isoprene, E caprolactam, tetrahydrofuran and ethylene oxide. When units derived from cyclic ethers, e.g., ethylene oxide units are present in the organic blocks they should be included with one or more of the specified vinyl, diene, lactam or lactone polymeric units. As the organic blocks there may therefore be present in the block copolymer homopolymeric blocks such as polyethylene blocks, polystyrene blocks and polymethyl methacrylate blocks or copolymeric blocks, for example polyethylene-polypropylene blocks, poly(styrene-butadiene)blocks or poly(acrylonitrile-butadiene-styrene)blocks.

The block copolymers may conveniently be prepared by a process involving anionic polymerization. According to this technique polymers with one or two functional end groups are prepared employing carbanion-producing catalysts which permit polymerization of a given monomer to take place such that the polymeric product contains carbanionic end groups, even after consumption of the monomer. Such end groups are capable of initiating the polymerization of further quantities of added monomer or the copolymerization of a different monomer. This anionic copolymerization process is readily applied to the preparation of block siloxane-organic copolymers for use in the compositions of this invention. For example a polymer of the AB type may be prepared firstly by polymerizing an organic monomeric compound such as styrene, under anionic polymerization conditions. Thereafter, an organosiloxane such as a cyclic trisiloxane or cyclic tetrasiloxane is added to the carbanion terminated organic polymer and copolymerization allowed to proceed to produce a polymer of the AB type. When a copolymer of the BAB type is desired the copolymerization may be terminated by the addition to the reaction mixture of a difunctional proton or cation donor, for example a diorganodihalosilane such as dimethyldichlorosilane. Such a donor will have the effect both of neutralizing the carbanion growth center and of linking the AB copolymers together to give what is substantially a copolymer of the BAB type. Copolymers of the ABA type may be obtained by polymerizing the organic monomer with a catalyst, e.g., potassium or potassium naphthalene giving rise to dianions in the organic polymer which is then copolymerized with the appropriate siloxane.

Methods for obtaining various other block copolymer configurations employing this general technique will be known to, or will be readily apparent to, those skilled in the art. For instance the formation of an AB type copolymer may be terminated by a proton donor having two or more functional groups which are capable of reaction with other functionally terminated AB copolymers to provide non-linear block copolymers. It will be appreciated from the foregoing that the blocks present in the copolymer need not be directly linked one to another but may be joined through one or more linking units.

Suitable carbanion-producing catalysts for use in the preparation of block-copolymers employed in the compositions of this invention are well known and include for example, alkali metals such as sodium and potassium, alkali metal alkyls such as lithium butyl and sodium butyl and alkali metal complexes and derivatives such as potassium naphthalene, diphenyl sodium and sodium anthracene.

The proportion of the block copolymer employed in the compositions of this invention may vary from 0.001 to 10 percent by weight, based on the weight of the organic polymer. Normally it is preferred to use as small a proportion of the copolymer as is consistent with obtaining the desired effect and in general we prefer to employ from 0.05 to 2 percent of the block copolymer.

Preparation of the compositions of this invention may be achieved by any convenient means. In most cases it may be carried out by dispersing the block copolymer in the preformed organic polymer. In some cases however the block copolymer may be added prior to or during polymerization of the organic monomer to the polymeric state. As a further alternative the block copolymer may be added during processing of the organic polymer or during compounding with other ingredients such as fillers and plasticizers.

The choice of the particular block copolymer for incorporation with the organic polymeric material will depend upon several factors including the nature of the organic polymer itself and the surface effect desired thereon. The organic blocks of the copolymer should be such that the organic portion of the copolymer is at least partially compatible with the organic polymer. In general it is convenient to choose a block copolymer containing organic blocks of a similar nature to the organic polymer itself. However, in view of the relatively small amounts of the block copolymer required to give the desired effect a certain amount of incompatibility between the organic portion of the copolymer and the organic polymer (1) can be tolerated. The relative weight proportions of the organosiloxane and organic blocks in the block copolymer is not thought to be narrowly critical and widely varying proportions can be present, for example from 5 to 90 percent and preferably 10 to 80 percent by weight of the copolymer may consist of the organosiloxane blocks. Preferred for use according to this invention are block copolymers having the AB or BAB configurations wherein A represents an organosiloxane block and B an organic block.

The process of this invention finds application in the modification of the surface properties of a wide variety of organic polymers. For instance incorporation of block copolymers containing dimethylsiloxane blocks into polyvinyl chloride or a polyolefin according to this invention facilitates the extrusion thereof and further provides the surface of the thermoplastic with a lasting water repellent, protective coating. It has been found that the invention is of particular interest with regard to improving the surface properties of protective organic coatings, for example those based on acrylic resins. In this connection we have found that the incorporation of the specified block copolymers with paint compositions leads to improvement in the weatherability of the paints and facilitates the removal therefrom of grime and other contamination. Preferred for use in this application are the polysiloxane-polystyrene copolymers as compatibility of such copolymers with paint resins can be achieved over a wide range of molecular weight, percentage of organosiloxane blocks and proportion used.

By incorporating block copolymers into rubbers, for example natural rubber and butadiene-styrene rubber, according to this invention improvements in the atmospheric ageing properties of the rubbers can be obtained.

The following examples illustrate the invention.

EXAMPLE 1

To styrene (10.4 g; 0.1 mole) in tetrahydrofuran (50 ml.) was added n-butyl lithium (0.0052 mole) as a 22 percent by weight solution in n-hexane, and polymerization of the styrene allowed to proceed at room temperature (22°C) for 3 minutes. After this time hexamethylcyclotrisiloxane (7.4 g.) was added as a solution in tetrahydrofuran (50 ml.) and polymerization allowed to proceed (for 1 hour) until 17 percent by weight of the cyclic siloxane had polymerized. The polymerization reaction was then terminated by the addition of dimethyldichlorosilane (0.336 g; 0.0026 mole). The product was a BAB type copolymer in which B represents polystyrene and A polydimethylsiloxane. It was recovered from the reaction mixture by precipitation from methanol and found to have a molecular weight of 10,000 and a silicon content of 4.1 percent. The copolymer (designated Copolymer A) contained 10.8 percent by weight of polydimethylsiloxane blocks. Further characterization of the copolymer by gel permeation chromatography revealed that the copolymer had a very narrow molecular weight distribution.

To two 100 g. samples of polystyrene were added 0.1 and 1.0 g. respectively of Copolymer A prepared as described above and the mixtures moulded into 2 × 0.125 inch discs at 180°C using a 10-ton steam heated press.

The critical surface tension of wetting $O^-c$ values for the discs, and for a control disc containing no block copolymer, were obtained by measuring the contact angles of drops of a given homologous series of liquids placed on them. The results obtained were as follows:

| % Block Copolymers | $O^-c$ dyne cm$^{-1}$ |
| --- | --- |
| 0 | 32.7 |
| 0.1% | 29.9 |
| 1.0% | 27.1 |

When a similar measurement was carried out on a disc of polystyrene into which 1 percent by weight of a polydimethylsiloxane had been incorporated a value of 31.0 was obtained for $O^-c$. $O^-c$ for a polydimethylsiloxane surface is 22–24 dynes cm$^{-1}$.

The results clearly show that the incorporation of the block copolymer had a significant effect on the surface properties of the styrene polymers.

EXAMPLE 2

The polystyrene disc prepared according to Example 1 and containing 1 percent by weight of the block copolymer was ground at one plane surface with an abrasive paste until its thickness was reduced by 1 mm. The abraded surface was then polished with a mild abrasive until smooth and glossy, measurements of the contact angle with respect to a drop of a pure liquid undertaken at regular intervals and the corresponding values of $O^-c$ calculated. After 5 hours it was found that $O^-c$ had returned to its value prior to abrading.

This test illustrated the ability of the block copolymer to restore the original properties even after severe abrasion.

EXAMPLE 3

A BAB type copolymer (designated Copolymer B) in which B represents a polystyrene block and A a polydimethylsiloxane block was prepared in the manner described in Example 1. The average molecular weights of the polystyrene and polydimethylsiloxane blocks were 3,000 and 35,000 respectively and the copolymer contained 35 percent by weight of polydimethylsiloxane blocks. The molecular weight distribution in this copolymer was broader than that in Copolymer A the ratio of the weight average molecular weight to the number average molecular weight being approximately 2.

An industrial stoving enamel paint formulation was made up by mixing

| | |
| --- | --- |
| Scopacron 15[1] | 90 |
| Epikote 1001[2] | 10 |
| Titanium dioxide | 90 |
| Aromatic solvent | 10 | all parts being expressed by weight.
[1]A thermosetting acrylic resin
[2]An epoxy resin.

To two samples of the above paint were added 0.1 and 1.0 percent of Copolymer B prepared as above and a suitable application viscosity obtained by the addition of a few percent of a 3:1 xylol-butanol mixture. The samples of the paint were coated on to aluminum panels and the coatings thereafter dried by exposure to a temperature of 135°C for 30 minutes. A control panel was also prepared using a similar paint except that the block copolymer was absent. The critical surface tension of the surfaces of the paint containing the block copolymer additive was 22 dynes cm$^{-1}$, that of the control surface was 28 dynes cm$^{-1}$.

The coatings obtained with the paint containing the block copolymer exhibited improved gloss over the control. They were also less prone to the pick-up of grime.

Similar results were obtained when the tests were repeated with a proprietory decorative household enamel paint where the critical surface tension of the paint was reduced from 26.5 dynes cm$^{-1}$ for the control to 22 dynes cm$^{-1}$ for the paint containing 0.1 and 1 percent by weight of the block copolymer additive.

The presence of the block copolymer had no noticeable effect on paint-substrate and intercoat adhesion.

EXAMPLE 4

When 1 percent weight of Copolymer B was incorporated into a disc of polystyrene in the manner described in Example 1 a value for $0^-c$ of 27.5 dynes cm$^{-1}$ was obtained.

EXAMPLE 5

A BAB type copolymer (designated Copolymer C) was prepared in the manner described for Copolymer A. This copolymer had a molecular weight of 10,000 and contained 58 percent by weight of polydimethylsiloxane blocks. When 1 percent by weight of this copolymer was incorporated into a polystyrene disc as described in Example 1 a value for $0^-c$ of 22 dynes cm$^{-1}$ was obtained. This value corresponds with that of a polydimethylsiloxane surface although no evidence was found of the existence of free polydimethylsiloxane on the polystyrene surface.

EXAMPLE 6

Two natural rubber compositions was prepared by mixing on a two roll mill the following ingredients, the parts being by weight,

|  | NR 1 | NR 2 |  |
|---|---|---|---|
| Smoked sheet | 100 | 100 | parts |
| Zinc oxide | 3.0 | 3.0 | parts |
| Stearic acid | 2.0 | 2.0 | parts |
| Vulcafor HBS | 0.75 | 0.75 | parts |
| Sulphur | 2.5 | 2.5 | parts |
| Ukarb 327 | 50 | 50 | parts |
| Dutrex R | 2.0 | 2.0 | parts |
| Copolymer B | — | 1.0 | parts |

Samples of the two mixes were then molded into sheets and vulcanized at 145°C for 20 minutes. The sheet prepared from NR2 (containing Copolymer B) was found to have a critical surface tension of wetting of 22 dynes cm$^{-1}$. The value for the sheet prepared from NR1 was 28 dynes cm$^{-1}$.

When other mixes were prepared from styrene-butadiene, butyl rubber and neoprene similar results were obtained.

EXAMPLE 7

Sheets of natural rubber and butadiene-styrene rubber prepared as in Example 6 were subjected to exposure to the atmosphere for a period of 8 months. It was found that sheets prepared from mixes containing Copolymer B retained their initial physical properties to a greater degree than those prepared from mixes not containing the copolymer.

EXAMPLE 8

Two butyl rubber mixes were prepared containing by weight the following,

|  | B1 | B2 |  |
|---|---|---|---|
| Butyl 325 | 100 | 100 | parts |
| Zinc oxide | 25 | 25 | parts |
| Ukarb 327 | 50 | 50 | parts |
| Shell Diala 'B' | 5.0 | 5.0 | parts |
| Sulphur | 1.0 | 1.0 | parts |
| G.M.F. (p quinone dioxime) | 2.0 | 2.0 | parts |
| Ancatax | 4.0 | 4.0 | parts |
| Copolymer B | — | 1.0 | parts |

Molded strips were then cut from sheets obtained by vulcanizing B1 and B2 for 30 minutes at 115°C and the cut strips aged for 10 days at 150°C.

The release properties of the aged butyl strips were examined by placing the strips on a mould and moulding an SBR tire sidewall compound against them. This procedure was repeated 20 times using fresh sidewall compound but the same butyl strips, the sidewall compound was easily removed from the strip containing the copolymer (B2) in all cases. However, sticking occurred after the 11th molding between the sidewall compound and the butyl strip not containing the copolymer (B1).

The results of this test illustrate the improved release properties which may be imparted to butyl rubber surfaces by incorporating a siloxane-organic copolymer into the mass of the butyl rubber. This technique may therefore advantageously be applied in the manufacture of butyl rubber bags for use in the molding of rubber tires, where easy and prolonged release of the molded tire from the bag is desirable.

That which is claimed is:

1. A composition comprising (1) an organic polymeric material selected from the group consisting of polyolefins, polyethylene terephthalate, polyvinyl chloride, polyvinylidene chloride, polystyrene, polymethyl methacrylate, natural rubber, polyisoprene, butadiene-styrene copolymer, chloroprene polymers, isobutylene polymers, acrylic resins, epoxy resins, polyamides, butadiene-acrylonitrile copolymers, melamine-formaldehyde resins, phenol-formaldehyde resins, and urea-formaldehyde resins; and (2) from 0.001 to 10 percent by weight based on the weight of said organic polymeric material of a linear block copolymer comprising at least one organosiloxane block (A) containing at least 20 units of the formula $R_2SiO$— wherein each R is selected from the group consisting of hydrogen atoms, monovalent hydrocarbon radicals, monovalent halogen-substituted hydrocarbon radicals and amino alkyl radicals and at least some of the R groups in said organosiloxane block are not hydrogen; and an organic block (B) selected from the group consisting of polymers formed by the polymerization of at least one compound selected from the group consisting of methyl methacrylate, styrene, chlorostyrene, alpha methyl styrene, vinyl chloride, vinyl pyridine, acrylonitrile, butadiene, isoprene, epsilon-caprolactam, and olefins, said organic block being at least partially compatible with said organic polymeric material; and said linear block copolymer being of the type BAB or of the type AB wherein B represents said organic block and A represents said organosiloxane block.

2. The composition of claim 1 wherein said organic polymeric material is selected from the group consisting of polyethylene and polypropylene.

3. The composition of claim 1 wherein each R group is methyl.

4. The composition of claim 3 wherein said organic block of said linear block copolymer is polystyrene.

5. The composition of claim 1 wherein said organic block of said linear block copolymer is polystyrene.

6. The composition of claim 1 wherein said organic block of said linear block copolymer is polyethylene or polypropylene.

7. The composition of claim 3 wherein said organic block of said linear block copolymer is polyethylene or polypropylene.

8. The composition of claim 1 wherein said linear block copolymer is of the BAB type.

9. The composition of claim 1 wherein said linear block copolymer is of the AB type.

10. The composition of claim 1 wherein in said linear block copolymer block A is a polydimethyl siloxane and block B is polystyrene.

11. The composition of claim 1 wherein said organic polymeric material is at least one polymer selected from the group consisting of polyolefins, polyvinyl chloride and acrylic resins.

12. The composition of claim 8 wherein said organic polymeric material is at least one polymer selected from the group consisting of polyolefins, polyvinyl chloride and acrylic resins.

13. The composition of claim 9 wherein block A is polydimethylsiloxane and block B is polystyrene.

14. The composition of claim 1 wherein the linear block copolymer of (2) is present in an amount of from 0.05 to 2 percent by weight.

15. The composition of claim 1 wherein said linear block copolymer has a molecular weight from 2,000 to 50,000.

16. The composition of claim 1 wherein said linear block copolymer is 5 to 90 percent by weight organosiloxane block.

17. The composition of claim 1 wherein said linear block copolymer is 10 to 80 percent by weight organosiloxane block.

* * * * *